US011934082B2

(12) United States Patent
Koito et al.

(10) Patent No.: US 11,934,082 B2
(45) Date of Patent: Mar. 19, 2024

(54) LIGHT CONTROL DEVICE AND ILLUMINATION DEVICE

(71) Applicant: Japan Display Inc., Tokyo (JP)

(72) Inventors: Takeo Koito, Tokyo (JP); Masashi Mitsui, Tokyo (JP); Tae Kurokawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 147 days.

(21) Appl. No.: 17/659,394

(22) Filed: Apr. 15, 2022

(65) Prior Publication Data

US 2022/0235918 A1 Jul. 28, 2022

Related U.S. Application Data

(63) Continuation of application No. PCT/JP2020/038684, filed on Oct. 13, 2020.

(30) Foreign Application Priority Data

Nov. 21, 2019 (JP) ................. 2019-210699

(51) Int. Cl.
 *G02F 1/29* (2006.01)
 *G02F 1/1343* (2006.01)
 *G02F 1/1347* (2006.01)
(52) U.S. Cl.
 CPC .......... *G02F 1/29* (2013.01); *G02F 1/134309* (2013.01); *G02F 1/13471* (2013.01); *G02F 2202/28* (2013.01)
(58) Field of Classification Search
 None
 See application file for complete search history.

(56) References Cited

U.S. PATENT DOCUMENTS

| 2005/0243237 A1 | 11/2005 | Sasuga |
| 2010/0149444 A1 | 6/2010 | Hikmet et al. |
| 2014/0354929 A1 | 12/2014 | Kobayashi et al. |

FOREIGN PATENT DOCUMENTS

| CN | 101675379 A | 3/2010 |
| CN | 102253563 A | 11/2011 |
| CN | 102809868 A | 12/2012 |
| CN | 104181728 A | 12/2014 |
| JP | 2005-317879 A | 11/2005 |

(Continued)

OTHER PUBLICATIONS

International Search Report dated Dec. 15, 2020 in PCT/JP2020/038684, filed on October 13, 2020, 2 pages.

(Continued)

*Primary Examiner* — Phu Vu
(74) *Attorney, Agent, or Firm* — Maier & Maier, PLLC

(57) ABSTRACT

According to one embodiment, a light control device includes a first substrate including a plurality of first control electrodes disposed in an effective area, and a plurality of feed lines disposed in a peripheral area, a second substrate, and a first liquid crystal layer. The first control electrodes are transparent electrodes. Each of the first control electrodes includes, in the effective area, first segments crossing a first direction at a first angle, second segments crossing the first direction at a second angle, and third segments crossing the first direction at a third angle. The first control electrode is electrically connected to the feed line. The first to third angles are different from each other.

11 Claims, 14 Drawing Sheets

(56) References Cited

FOREIGN PATENT DOCUMENTS

JP        2010-230887 A     10/2010
JP        2019-86539 A      6/2019

OTHER PUBLICATIONS

Office Action dated Aug. 9, 2023, in corresponding Chinese Application No. 202080081082.0, 10 pages.
Notice of Reasons for Refusal dated Aug. 22, 2023, in corresponding Japanese Application No. 2019-210699, 10 pages.

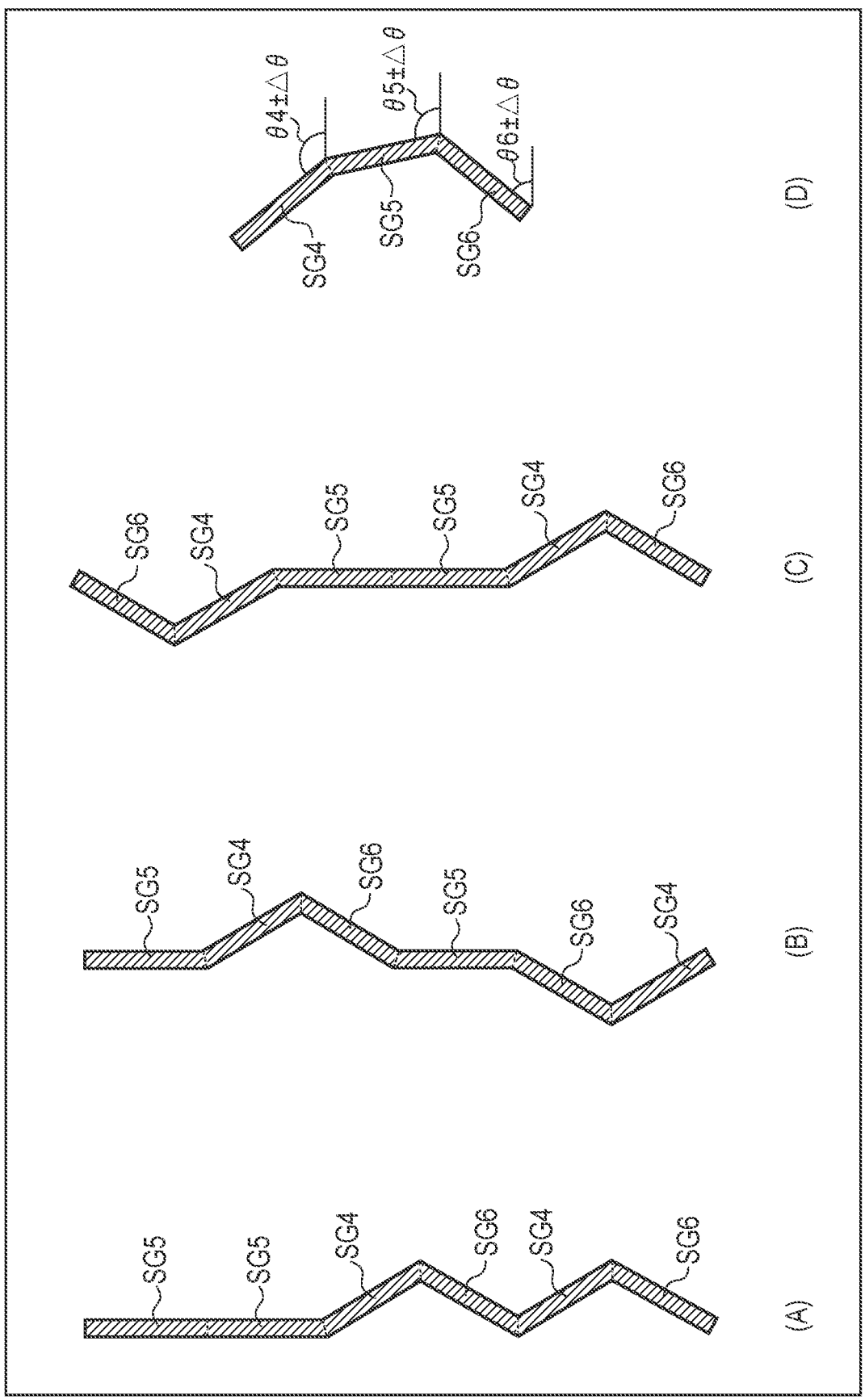
F I G. 10

LIGHT CONTROL DEVICE AND ILLUMINATION DEVICE

CROSS-REFERENCE TO RELATED APPLICATIONS

This application is a Continuation Application of PCT Application No. PCT/JP2020/038684, filed Oct. 13, 2020 and based upon and claiming the benefit of priority from Japanese Patent Application No. 2019-210699, filed Nov. 21, 2019, the entire contents of all of which are incorporated herein by reference.

FIELD

Embodiments described herein relate generally to a light control device and an illumination device.

BACKGROUND

In recent years, various types of liquid crystal lenses configured to control paths of the light emitted from a light source have been proposed. For example, there is a liquid crystal lens including a plurality of arcuate electrodes and lead electrodes connected to the arcuate electrodes. For another example, there is a technique of layering a plurality of liquid crystal lenses in which strip electrodes of one liquid crystal lens and strip electrodes of the other liquid crystal lens overlap with each other in a shifted manner, such that the strip electrodes are arranged in a pseud fine structure. The lead electrode connected to each of the strip electrodes will be disposed in an effective area where the liquid crystal lens is formed, and it may cause disturbance in the electric field to form the liquid crystal lens.

BRIEF DESCRIPTION OF THE DRAWINGS

FIG. 10 is a plan view illustrating another structural example of a second control electrode E2.

DETAILED DESCRIPTION

Figure 1:
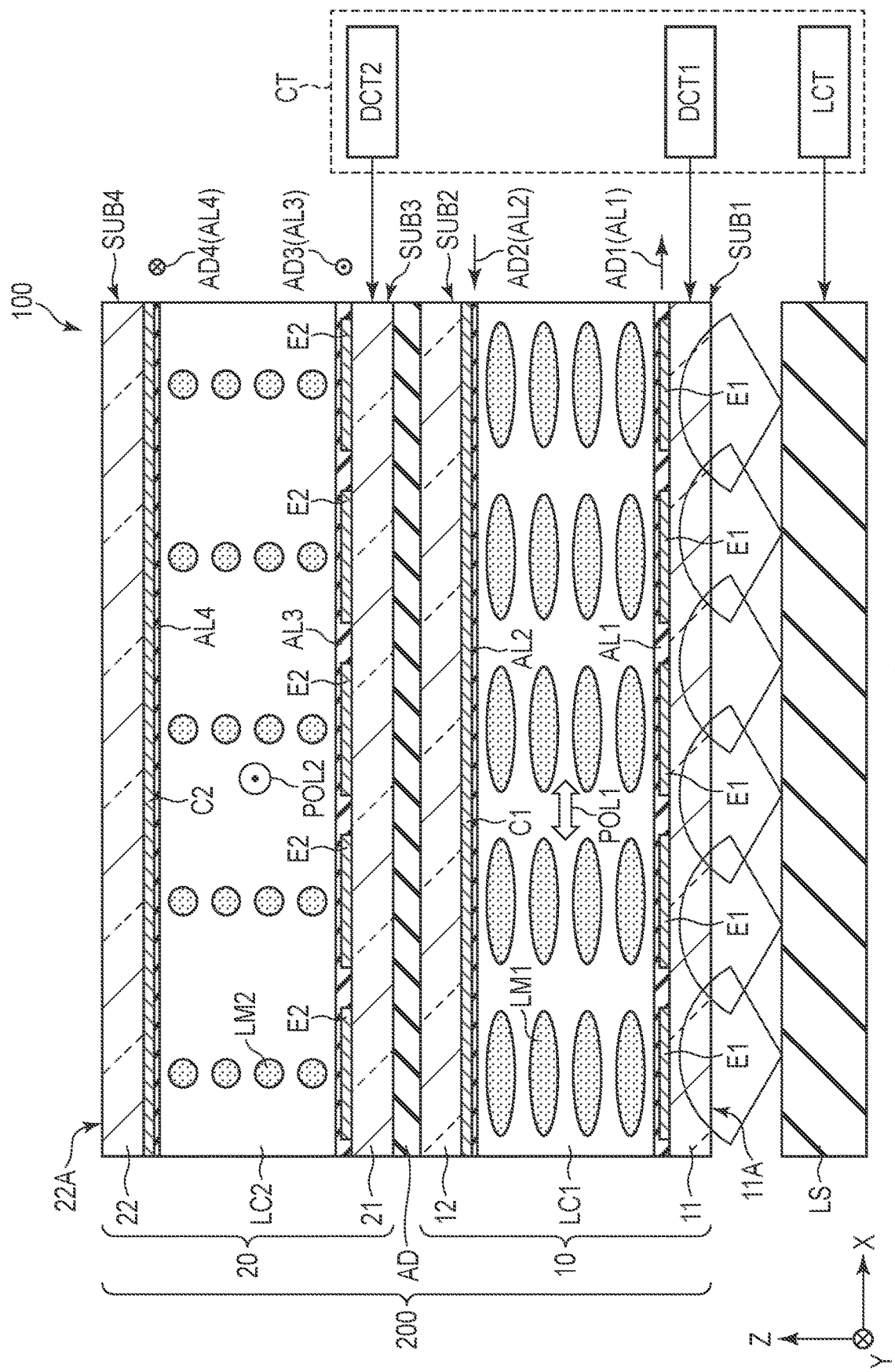
FIG. 1 is a diagram illustrating an example of the structure of an illumination device 100 of an embodiment.

In general, according to one embodiment, a light control device includes: a first substrate including a plurality of first control electrodes disposed in an effective area, and a plurality of feed lines disposed in a peripheral area; a second substrate; and a first liquid crystal layer held between the first substrate and the second substrate, wherein the first control electrodes are transparent electrodes, each of the first control electrodes includes, in the effective area, first segments crossing a first direction at a first angle, second segments crossing the first direction at a second angle, and third segments crossing the first direction at a third angle, each of the first control electrodes extends in the peripheral area, and is electrically connected to one of the feed lines, and the first to third angles are different from each other.

According to another embodiment, a light control device includes: a first liquid crystal cell including a first control electrode; and a second liquid crystal cell including a second control electrode, wherein the second liquid crystal cell overlaps the first liquid crystal cell, the first control electrode and the second control electrode are transparent electrodes, the first control electrode includes first segments crossing a first direction at a first angle, second segments crossing the first direction at a second angle, and third segments crossing the first direction at a third angle, the second control electrode includes fourth segments crossing the first direction at a fourth angle, fifth segments crossing the first direction at a fifth angle, and sixth segments crossing the first direction at a sixth angle, and the first to sixth angles are different from each other.

According to another embodiment, a light control device includes: a first substrate including a plurality of first control electrodes disposed in a first effective area, and a plurality of second control electrodes disposed in a second effective area which is adjacent to the first effective area; a second substrate; and a first liquid crystal layer held between the first substrate and the second substrate, wherein the first control electrodes and the second control electrodes are transparent electrodes, the first control electrodes are apart from the second control electrodes, each of the first control electrodes includes first segments crossing a first direction at a first angle, second segments crossing the first direction at a second angle, and third segments crossing the first direction at a third angle, each of the second control electrodes includes fourth segments crossing the first direction at a fourth angle, fifth segments crossing the first direction at a fifth angle, and sixth segment crossing the first direction at a sixth angle, and the first to sixth angles are different from each other.

According to another embodiment, an illumination device includes: a light source; and a light control device configured to control light emitted from the light source, wherein the light control device includes a first substrate including a plurality of first control electrodes disposed in an effective area and a plurality of feed lines disposed in a peripheral area, a second substrate, and a first liquid crystal layer held between the first substrate and the second substrate, wherein the first control electrodes are transparent electrodes, each of the first control electrodes includes, in the effective area, first segments crossing a first direction at a first angle, second segments crossing the first direction at a second angle, and third segments crossing the first direction at a third angle, each of the first control electrodes extends in the peripheral area, and is electrically connected to one of the feed lines, and the first to third angles are different from each other.

According to another embodiment, an illumination device includes: a light source; and a light control device configured to control light emitted from the light source, wherein the light control device includes a first liquid crystal cell including a first control electrode and a second liquid crystal cell including a second control electrode, wherein the second liquid crystal cell overlaps the first liquid crystal cell, the first control electrode and the second control electrode are transparent electrodes, the first control electrode includes first segments crossing a first direction at a first angle, second segments crossing the first direction at a second angle, and third segments crossing the first direction at a third angle, the second control electrode includes fourth segments crossing the first direction at a fourth angle, fifth segments crossing the first direction at a fifth angle, and sixth segments crossing the first direction at a sixth angle, and the first to sixth angles are different from each other.

According to another embodiment, an illumination device includes: a light source; and a light control device configured to control light emitted from the light source, wherein the light control device includes a first substrate including a plurality of first control electrodes disposed in a first effective area and a plurality of second control electrodes disposed in a second effective area which is adjacent to the first effective area, a second substrate, and a first liquid crystal layer held between the first substrate and the second substrate, wherein the first control electrodes and the second control electrodes are transparent electrodes, the first control electrodes are apart from the second control electrodes, each of the first control electrodes includes first segments crossing a first direction at a first angle, second segments crossing the first direction at a second angle, and third segments crossing the first direction at a third angle, each of the second control electrodes includes fourth segments crossing the first direction at a fourth angle, fifth segments crossing the first direction at a fifth angle, and sixth segments crossing the first direction at a sixth angle, and the first to sixth angles are different from each other.

According to an embodiment, a light control device and an illumination device which can reduce an ineffective area can be presented.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a diagram schematically showing a configuration example of an illumination device 100 according to one embodiment. In this embodiment, a first direction X, a second direction Y and a third direction Z are orthogonal to each other, but they may intersect at an angle other than 90°. In the following descriptions, viewing from above downward onto an X-Y plane defined by the first direction X and the second direction Y is referred to as plan view.

The illumination device 100 includes a light source LS, a light control device 200 configured to control the light emitted from the light source LS, and a controller CT. The light source LS emits light toward the third direction Z. The light emitted from the light source LS is, for example, natural light (non-polarized light). The light control device 200 overlaps the light source LS in the third direction Z. The light control device 200 includes a first liquid crystal cell 10 and a second liquid crystal cell 20. The first liquid crystal cell 10 and the second liquid crystal cell 20 may have substantially the same elements, or may have different elements.

The first liquid crystal cell 10 includes a first substrate SUB1, a second substrate SUB2, and a first liquid crystal layer LC1. The first substrate SUB1 includes an insulating substrate 11, a plurality of first control electrodes E1 disposed on the insulating substrate 11, and an alignment film AL1 covering the first control electrodes E1. The second substrate SUB2 includes an insulating substrate 12, a first common electrode C1 disposed on the insulating substrate 12, and an alignment film AL2 covering the first common electrode C1. The first common electrode C1 is opposed to the first control electrodes E1.

The second liquid crystal cell 20 includes a third substrate SUB3, a fourth substrate SUB4, and a second liquid crystal layer LC2. The third substrate SUB3 includes an insulating substrate 21, a plurality of second control electrodes E2 disposed on the insulating substrate 21, and an alignment film AL3 covering the second control electrodes E2. The fourth substrate SUB4 includes an insulating substrate 22, a second control electrode C2 disposed on the insulating substrate 22, and an alignment film AL4 covering the second common electrode C2. The second common electrode C2 is opposed to the second control electrodes E2.

The insulating substrates 11 and 12, and insulating substrates 21 and 22 are transparent substrates such as glass or resin substrates.

The first control electrodes E1, second control electrodes E2, first common electrode C1, and second common electrode C2 are transparent electrodes formed of transparent conductive materials such as indium tin oxide (ITO) and indium zinc oxide (IZO). The specific shapes of the first control electrodes E1 and the second control electrodes E2 will be described later.

The alignment films AL1 to AL4 are horizontal alignment films with the alignment restriction force which is substantially parallel to the X-Y plane. For example, alignment processing direction AD1 of the alignment film AL1 and alignment processing direction AD2 of the alignment film AL2 are both parallel to the first direction X and are opposite to each other. Furthermore, alignment processing direction AD3 of the alignment film AL3 and alignment processing direction AD4 of the alignment film AL4 are both parallel to the second direction Y and are opposite to each other. The alignment processing may be a rubbing processing or an optical-alignment processing.

The first liquid crystal layer LC1 is held by the alignment films AL1 and AL2 between the first substrate SUB1 and the second substrate SUB2, and includes liquid crystal molecules LM1 initially aligned along the first direction X. The second liquid crystal layer LC2 is held by the alignment films AL3 and AL4 between the third substrate SUB3 and the fourth substrate SUB4, and includes liquid crystal molecules LM2 initially aligned along the second direction Y. That is, the initial alignment direction of the liquid crystal molecules LM1 intersects the initial alignment direction of the liquid crystal molecules LM2. Note that, the initial alignment corresponds to the alignment of the liquid crystal molecules when no voltage is applied to the liquid crystal layer, or the alignment of the liquid crystal molecules due to the alignment restriction force by the pair of alignment films holding the liquid crystal layer. The first liquid crystal layer LC1 and the second liquid crystal layer LC2 have, for example, positive dielectric constant anisotropy, or may have negative dielectric constant anisotropy.

The second liquid crystal cell 20 overlaps on top of the first liquid crystal cell 10 in the third direction Z. The insulating substrate 12 and the insulating substrate 21 are adhered to each other by a transparent adhesive layer AD. The refractive index of the adhesive layer AD is equivalent to the refractive index of the insulating substrates 12 and 21. On the other hand, the outer surface 11A of the insulating substrate 11 and the outer surface 22A of the insulating substrate 22 are in contact with an air layer, respectively. The outer surface 22A may be provided with, if necessary, a UV cut layer to inhibit the degradation of the liquid crystal layer due to external light, a diffusion layer to mitigate the effect of uneven alignment of the liquid crystal molecules, or an outer surface 22A may be matte treated.

The controller CT includes a light source controller LCT, and voltage controllers DCT1 and DCT2. The light source controller LCT controls a current value that drives the light source LS, for example. The voltage controller DCT1 controls a voltage to be applied to the first control electrodes E1 and the first common electrode C1 in the first liquid crystal cell 10. The voltage controller DCT2 controls the voltage to be applied to the second control electrodes E2 and the second common electrode C2 in the second liquid crystal cell 20.

In such a light control device 200, the light source LS is provided to be opposed to the outer surface 11A of the insulating substrate 11. That is, the outer surface 11A functions as an incident surface of the illumination light. The first liquid crystal cell 10 mainly modulates the first polarization component (P polarization) POL1 of the incident light. In the coordinate system of FIG. 1, the first polarization component POL1 is linearly polarized light with the oscillation plane in the first direction X. The second liquid crystal cell 20 mainly modulates the second polarization component (S polarization) POL2 passing through the first liquid crystal cell 10. The second polarization component POL2 is linearly polarized light with the oscillation plane in the second direction Y.

Modulation here refers to the refraction, convergence, or divergence of polarized light components passing through the liquid crystal layer by a refractive index distribution type lens (hereinafter referred to as liquid crystal lens) formed in the liquid crystal layer. The degree of convergence or divergence (modulation rate) is controlled by the voltage applied to the liquid crystal layer. That is, the modulation rate of the first polarization component in the first liquid crystal cell 10 is controlled by the voltage controller DCT1, and the modulation rate of the second polarization component in the second liquid crystal cell 20 is controlled by the voltage controller DCT2. The voltage controller DCT1 and the voltage controller DCT2 may be controlled by the same voltage conditions, or by different voltage conditions. Furthermore, each of the voltage controllers DCT1 and DCT2 may be controlled under the voltage conditions to form a convex type liquid crystal lens, a concave type liquid crystal lens, or any other shape of liquid crystal lens.

Figure 2:
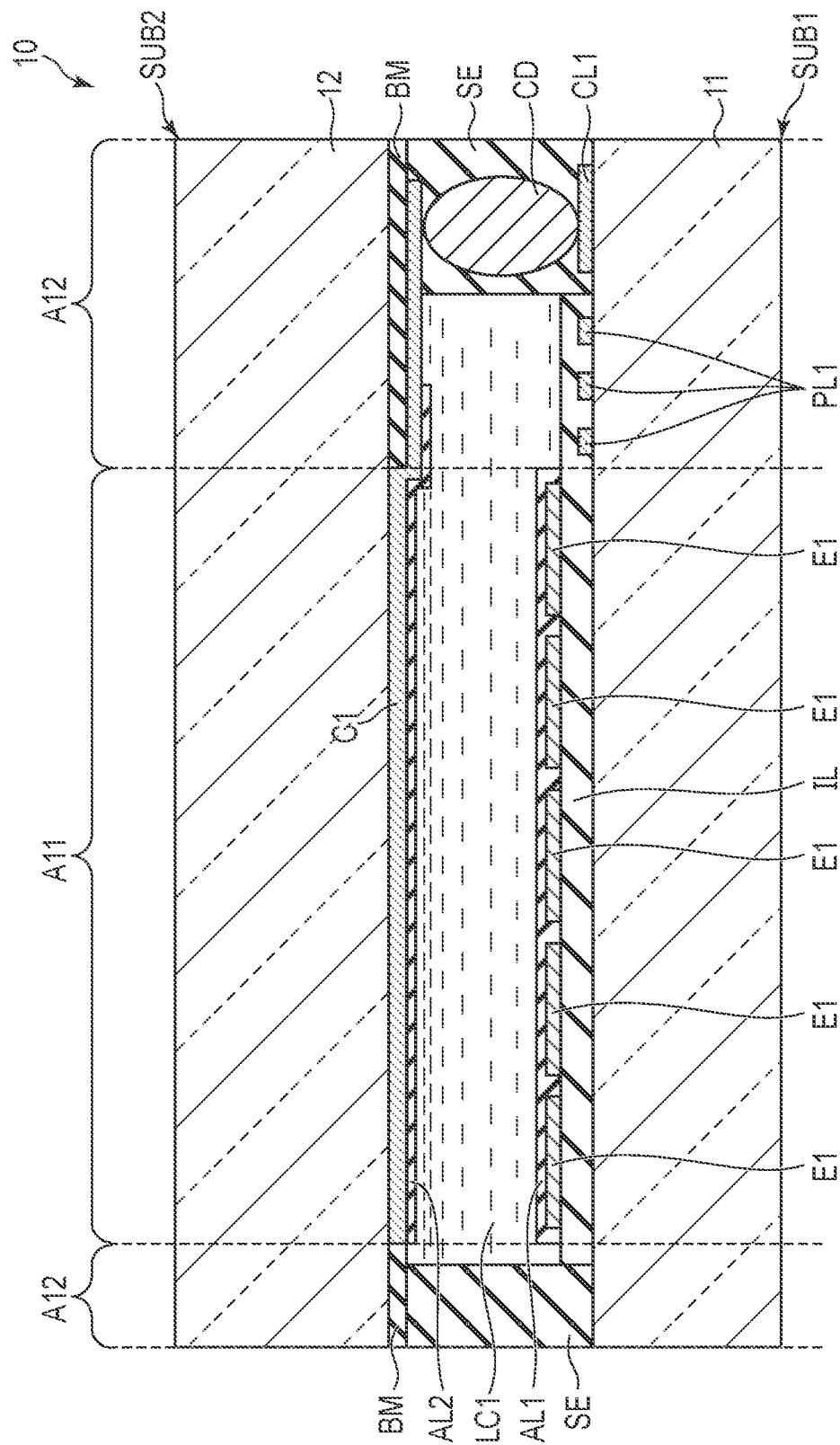
FIG. 2 is a cross-sectional view of a structural example of a first liquid crystal cell 10.

FIG. 2 is a cross-sectional view of a structural example of the first liquid crystal cell 10. Although the first liquid crystal cell 10 will be described here, the second liquid crystal cell 20 has the same cross-sectional structure as the first liquid crystal cell 10, and the explanation thereof is omitted.

The first liquid crystal cell 10 includes an effective area A11, which modulates the transmitted polarization component, and a peripheral area A12 outside the effective area A11. In the substrate SUB1, a plurality of first feed lines PL1 and common line CL1 are disposed in the peripheral area A12 and covered with an insulating film IL. The first control electrodes E1 are provided with the effective area A11, are located on the insulating film IL, and covered with the alignment film AL1. The first control electrodes E1, feed lines PL1, and common line CL1 are electrically connected to the voltage controller DCT1 in FIG. 1.

In the second substrate SUB2, the light-shielding layer BM is provided with the peripheral area A12. The inner area surrounded by the light-shielding layer BM corresponds to the effective area A11. The first common electrode C1 is a single flat electrode located on substantially the entire surface of the effective area A11, and a part thereof extends to the peripheral area A12. The first common electrode C1 is opposed to the plurality of the first control electrodes E1 via the first liquid crystal layer LC1 in the effective area A11. The first common electrode C1 is opposed to the feed lines PL1 and common line CL1 in the peripheral area A12.

The first substrate SUB1 and the second substrate SUB2 are adhered by a sealant SE in the peripheral area A12. The sealant SE includes a conductive material CD. The conductive material CD is interposed between the common line CL1 and the first common electrode C1. The common line CL1 and the first common electrode C1 are electrically connected each other.

Figure 3:
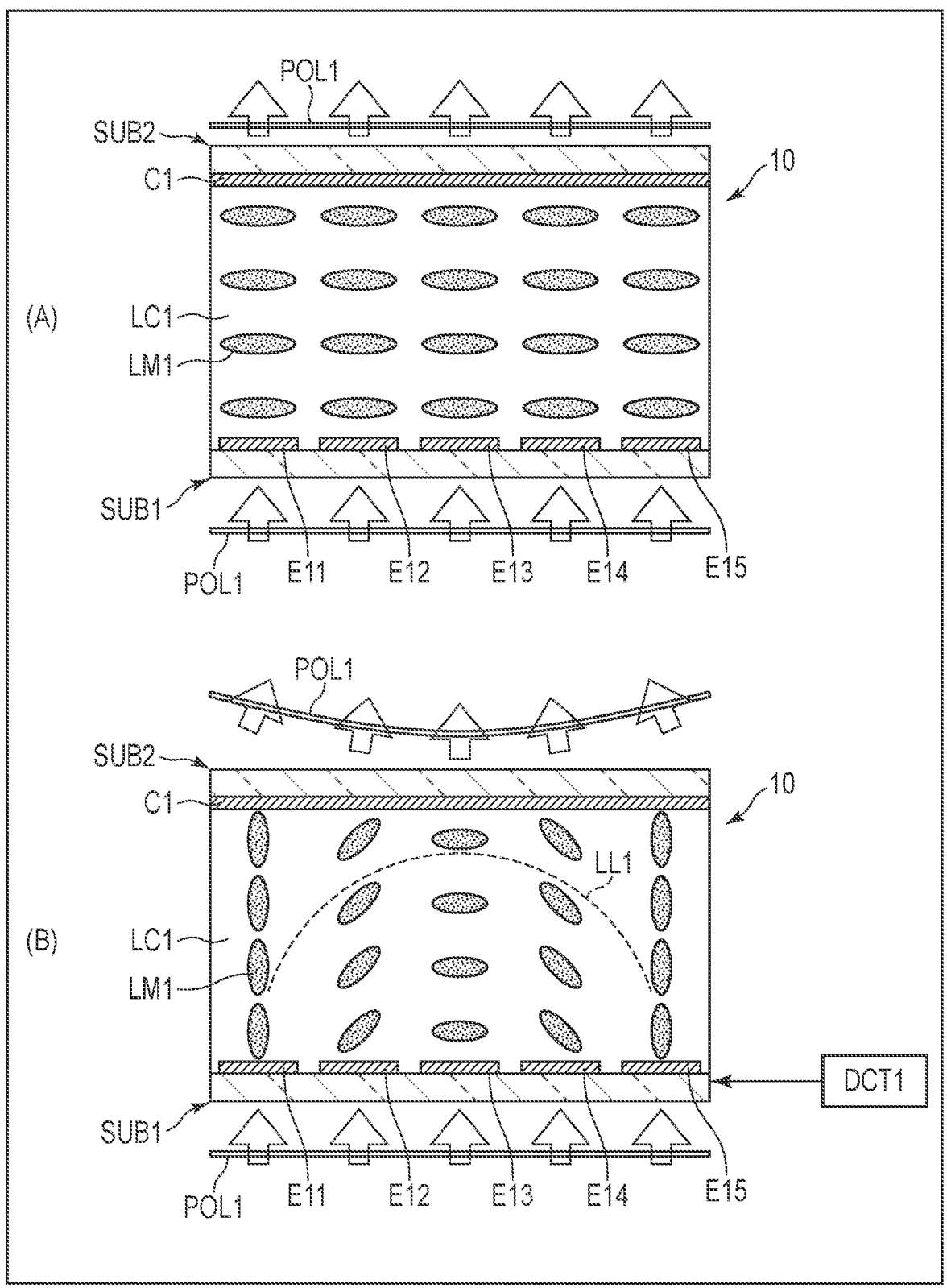
FIG. 3 is a diagram illustrating a liquid crystal lens LL1 formed in the first liquid crystal cell 10.

FIG. 3 is a diagram illustrating a liquid crystal lens LL1 formed in the first liquid crystal cell 10. In FIG. 3, only the structures necessary for explanation will be illustrated. Although the explanation is omitted, a similar liquid crystal lens LL2 can be formed in the second liquid crystal cell 20 as the liquid crystal lens LL1 explained with reference to FIG. 3.

(A) of FIG. 3 illustrates an off state (OFF) in which no potential difference occurs between the first control electrodes E11 to E15 and the first common electrode C1. The liquid crystal molecules LM1 contained in the first liquid crystal layer LC1 are initially aligned by the alignment restriction force of the alignment films AL1 and AL2.

(B) of FIG. 3 illustrates an on state (ON) where a potential difference is formed between the first control electrodes E11 to E15 and the first common electrode C1. The voltage controller DCT1 supplies a predetermined voltage to the first control electrodes E11 to E15 and the first common electrode C1, respectively. The first liquid crystal layer LC1 has a positive dielectric constant anisotropy, as described above. Thus, the liquid crystal molecule LM1 is aligned such that the long axis thereof is along the electric field when the electric field is formed.

An electric field along the third direction Z is formed in the area where each of the first control electrodes E11 and E15 and the first common electrode CE1 are opposed to each other, and thus, the liquid crystal molecule LM1 is aligned such that the long axis thereof is along the third direction Z. The electric field is hardly formed in the area where the first control electrode E13 and the first common electrode C1 are opposed to each other, and the liquid crystal molecules LM1 are maintained in the initial alignment state. In the area where the first control electrode E12 and the first common electrode C1 are opposed to each other, a middle alignment state between the area where the first control electrode E11 and the first common electrode C1 are opposed to each other and the area where the first control electrode E13 and the first common electrode C1 are opposed to each other, is formed. In the area where the first control electrode E14 and the first common electrode C1 are opposed to each other, a middle alignment state between the area where the first control electrode E15 and the first common electrode C1 and the area where the first control electrode E13 and the first common electrode C1 are opposed to each other, is formed.

The liquid crystal molecule LM1 has a refractive index anisotropy Δn. Therefore, the first liquid crystal layer LC1 has a refractive index distribution according to the alignment state of the liquid crystal molecule LM1. Or, the first liquid crystal layer LC1 has a distribution of retardation expressed by Δn·d, where a thickness of the first liquid crystal layer LC1 along the third direction Z is d. The liquid crystal lens LL1 illustrated by the dotted line in the figure is formed by such a distribution of refractive index or retardation.

In the off state in (A) of FIG. 3, the first liquid crystal layer LC1 has an almost uniform refractive index distribution and no liquid crystal lens is formed. Thus, the first polarization component POL1 transmits through the first liquid crystal layer LC1 without being modulated.

In the on state shown in (B) of FIG. 3, the first liquid crystal layer LC1, as described above, has a liquid crystal lens LL1. Therefore, the first polarization component POL1 is modulated when transmitting through the first liquid crystal layer LC1.

Figure 4:
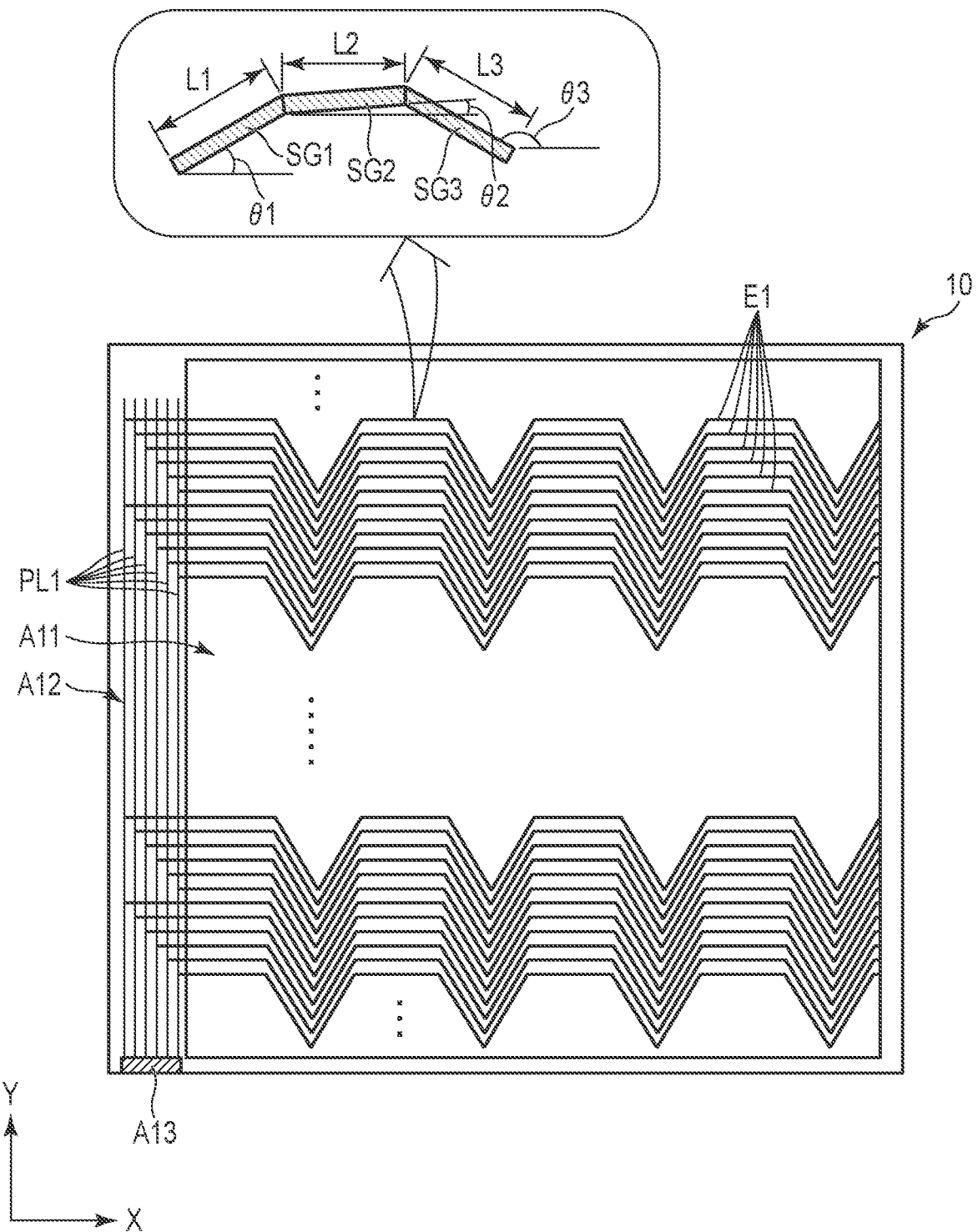
FIG. 4 is a plan view illustrating a structural example of the first liquid crystal cell 10.

FIG. 4 is a plan view illustrating a structural example of the first liquid crystal cell 10. Note that, in FIG. 4, only the main parts of the first liquid crystal cell 10 will be illustrated.

The feed lines PL1 are aligned in the first direction X in the peripheral area A12. Each of the feed lines PL1 extends to a terminal part A13. Although this is not detailed, the terminal part A13 includes a plurality of terminals connected to each of the feed lines PL1, and is electrically connected to a flexible wiring substrate and the like.

The first control electrodes E1 have substantially the same shape, and are aligned in the second direction Y in the effective area A11. Each of the first control electrodes E1 extends into the peripheral area A12 and is electrically connected to any of the feed lines PL1.

The shape of the first control electrode E1 will be described below. For example, when the first direction X parallel to the direction of extension of one side of the first liquid crystal cell 10 is used as a reference, the first control electrode E1 has a plurality of segments that intersect at different angles with respect to the first direction X. Note that the angle θ of each segment with respect to the first direction X is defined as a counterclockwise angle with respect to the first direction X in the X-Y plane.

In the example of FIG. 4 shown in an enlarged manner, the first control electrode E1 includes, in the effective area A11, a plurality of first segments SG1, a plurality of second segments SG2, and a plurality of third segments SG3. Each of the first segments SG1 extends in the direction intersecting the first direction X at a first angle θ1. Each of the second segments SG2 extends in a direction intersecting the first direction X at a second angle θ2. Each of the third segments SG3 extends in a direction intersecting the first direction X at a third angle θ3. The first angle θ1, second angle θ2, and third angle θ3 are different angles from each other. In one example, the first angle θ1 is 60°, the second angle θ2 is 0°, and the third angle θ3 is 120°. In another example, the first angle θ1 is 30°, the second angle θ2 is 0°, and the third angle θ3 is 150°.

The first angle θ1, second angle θ2, and third angle θ3 include at least one acute angle and at least one obtuse angle. In the example above, the first angle θ1 is an acute angle, and the third angle 93 is an obtuse angle.

The obtuse angle is an integer multiple of the acute angle. In one of the above examples, the third angle θ3 (120°) corresponds to twice the first angle θ1 (60°). In the other example above, the third angle θ3 (150°) corresponds to five times the first angle θ1 (30°).

In effective area A11, the sum of the lengths L1 of the first segments SG1, the sum of the lengths L2 of the second segments SG2, and the sum of the lengths L3 of the third segments SG3 should be approximately equal. For example, if the lengths L1 and L3 are equal, the number of the first segments SG1, the number of the second segments SG2, and the number of the third segments SG3 of the first control electrode E1 are equal.

Figure 5:
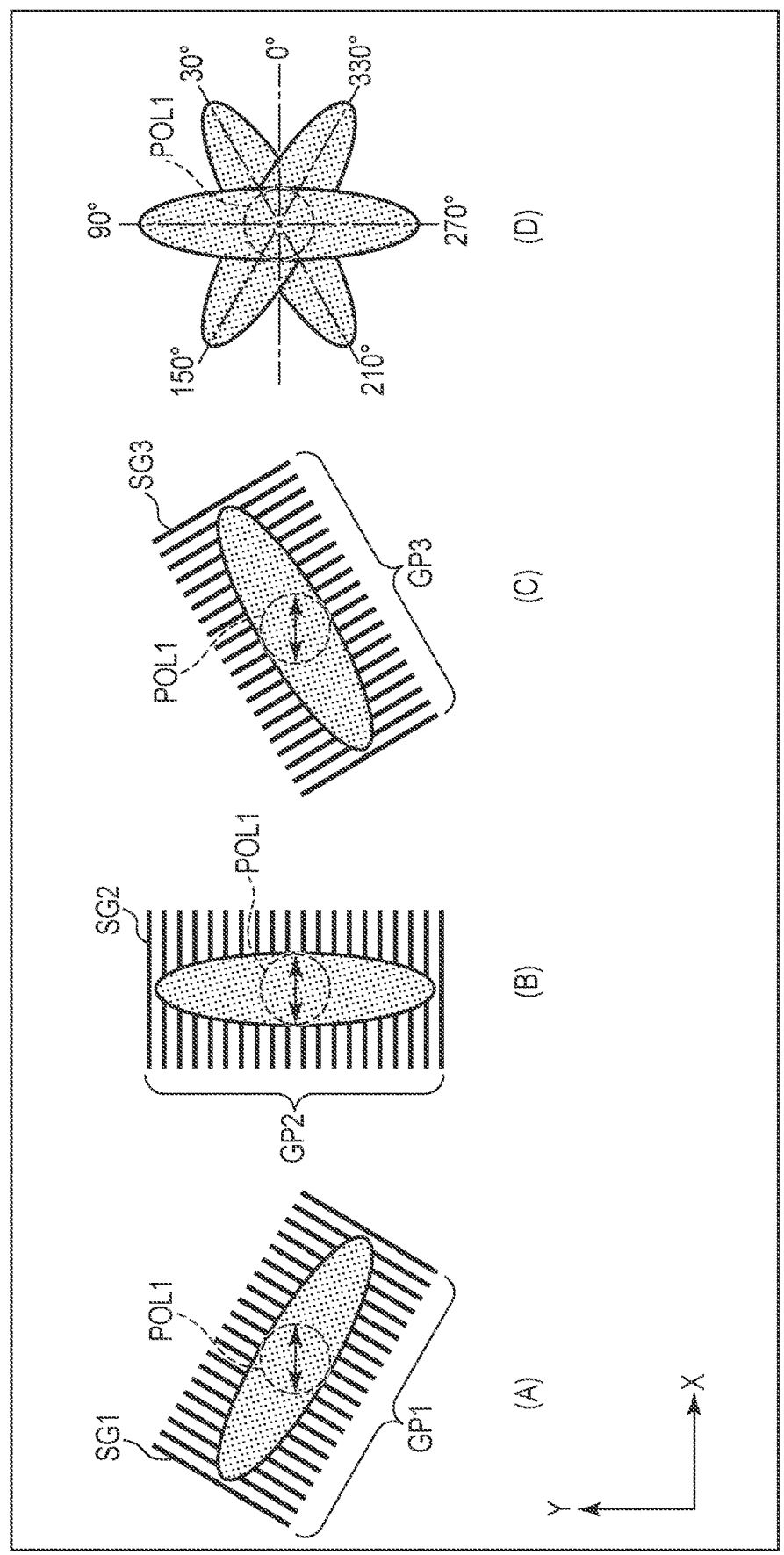
FIG. 5 is a diagram illustrating a light modulation effect in each segment of a first control electrode E1.

FIG. 5 illustrates the modulation effect of light in each segment of the first control electrode E1. (A) of FIG. 5 shows the modulation effect of a segment group GP1 which includes a plurality of first segments SG1. The first segments SG1 are arranged at an almost equal pitch. (B) of FIG. 5 shows the modulation effect of a segment group GP2 which includes a plurality of second segments SG2. The second segments SG2 are arranged at an almost equal pitch. (C) of FIG. 5 shows the modulation effect of a segment group GP3 which includes a plurality of third segments SG3. The third segments SG3 are arranged at an almost equal pitch.

In the first liquid crystal cell 10 of FIG. 4, when the liquid crystal molecules LM1 of the first liquid crystal layer LC1 are initially aligned in the first direction X, the first polarization component POL1 diverges, when passing through each of the segment groups GP1 to GP3, in a direction that is substantially orthogonal to the extension direction of each segment.

For example, as shown in (A) of FIG. 5, if the first segment SG1 extends in the direction of the first angle θ1 of 60° with respect to the first direction X, the first polarization component POL1 passing through the segment group GP1 diverges in the 150°-330° direction in the X-Y plane.

As shown in (B) of FIG. 5, if the second segment SG2 extends in the direction of the second angle θ2 of 0° with respect to the first direction X, the first polarization component POL1 passing through the segment group GP2 diverges in the 90°-270° direction in the X-Y plane.

As shown in (C) of FIG. 5, if the third segment SG3 extends in the direction of the third angle θ3 of 120° with respect to the first direction X, the first polarization component POL1 passing through the segment group GP3 diverges in the 30°-210° direction in the X-Y plane.

Therefore, as shown in (D) of FIG. 5, the first polarization component POL1 diverges in six directions in the X-Y plane.

Figure 6:
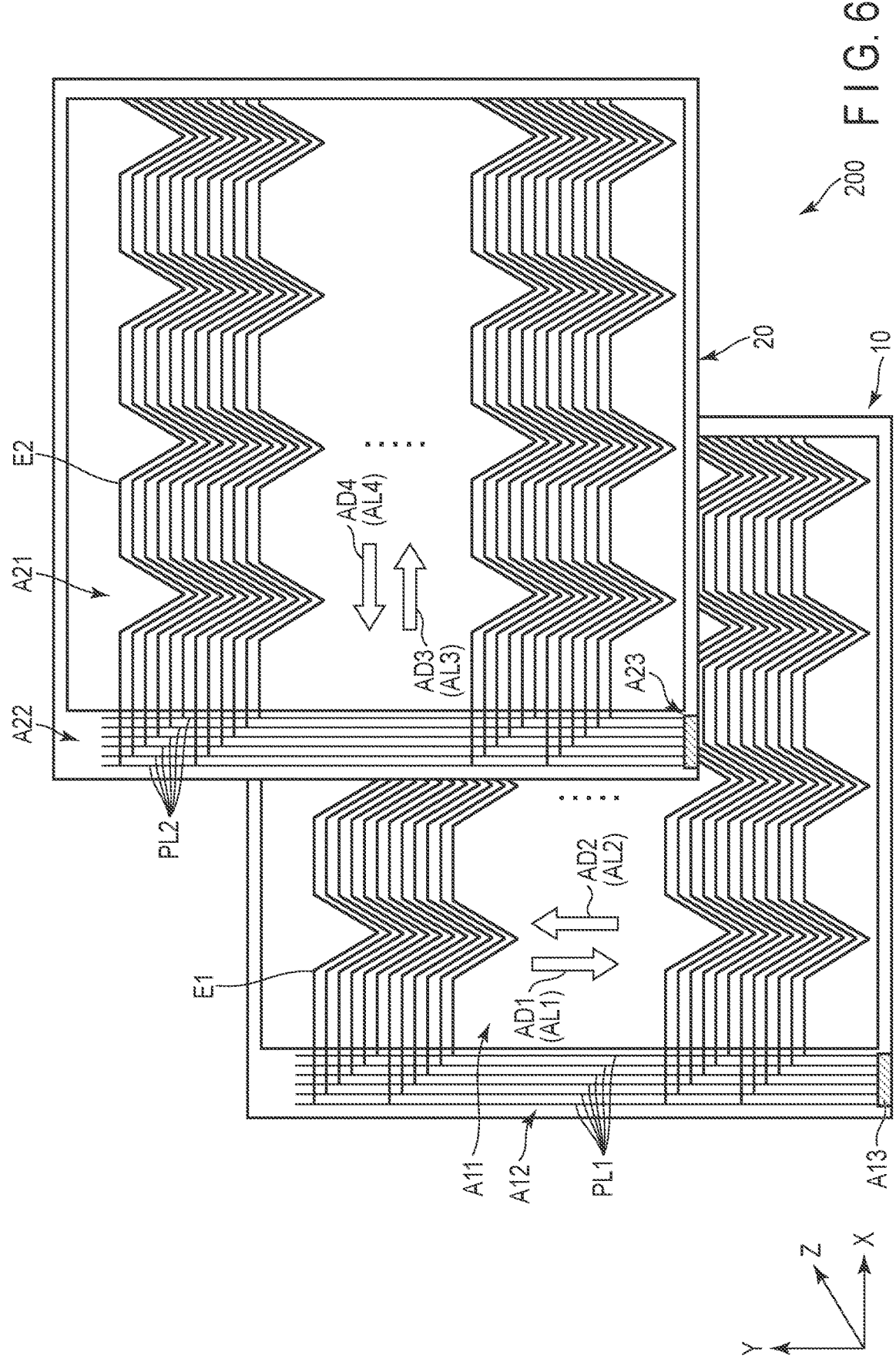
FIG. 6 is a diagram illustrating a structural example of a light control device 200.

FIG. 6 shows a structural example of a light control device 200. Note that, in FIG. 6, only the main parts necessary for explanation will be shown. The first liquid crystal cell 10 and the second liquid crystal cell 20 overlap each other in the third direction Z.

The structure of the first liquid crystal cell 10 is as described in FIG. 4.

The second liquid crystal cell 20 is structured substantially similar to the first liquid crystal cell 10. The second liquid crystal cell 20 has an effective area A21, which modulates the transmitted polarization component, and a peripheral area A22 outside the effective area A21. In the third direction Z, the effective area A21 overlaps the effective area A11, and the peripheral area A22 overlaps the peripheral area A12.

The feed lines PL2 are aligned in the first direction X in peripheral area A22. Each of the feed lines PL2 extends to the terminal part A23 and is electrically connected to a flexible circuit board and the like. The second control electrodes E2 have substantially the same shape and are aligned in the second direction Y in the effective area A21. Each of the second control electrodes E2 extends to the peripheral area A22 and is electrically connected to any of the feed lines PL2. The shape of the second control electrode E2 is the same as that of the first control electrode E1, and the explanation is omitted. In one example, such a second control electrode E2 overlaps the first control electrode E1 in a plan view.

Note that, the second control electrode E2 may be displaced in at least one direction of the first direction X and the second direction Y with respect to the first control electrode E1 in a plan view, or may be displaced in θ-direction with respect to the first control electrode E1 in a plan view.

The alignment processing direction AD1 of the alignment film AL1 and the alignment processing direction AD2 of the alignment film AL2 in the first liquid crystal cell 10 are substantially orthogonal to the alignment processing direction AD3 of the alignment film AL3 and the alignment processing direction AD4 of the alignment film AL4 in the second liquid crystal cell 20. However, the alignment processing directions AD1 to AD4 are not limited to the examples shown in the figure.

The light incident on the light control device 200 includes the first polarization component POL1 and the second polarization component POL2. One polarization component of the first polarization component POL1 and the second polarization component POL2 will be mainly modulated in multiple directions in the first liquid crystal cell 10, as described with reference to FIG. 5, and similarly, the other polarization component is mainly modulated in multiple directions in the second liquid crystal cell 20.

According to the light control device 200, the first liquid crystal cell 10 for mainly modulating one polarization component of incident light and the second liquid crystal cell 20 for mainly modulating the other polarization component of incident light can be configured with the same specifications except for the alignment processing direction. Therefore, by overlapping the first liquid crystal cell 10 and the second liquid crystal cell 20, the light control device 200 which modulates (converges or diverges) incident light can be provided.

Furthermore, the first control electrode E1 of the first liquid crystal cell 10 is electrically connected to the feed line PL1 in the peripheral area A12. Furthermore, the second control electrode E2 of the second liquid crystal cell 20 is electrically connected to the feed line PL2 in the peripheral area A22. Therefore, in the effective areas A11 and A12, feed lines PL1 and PL2 are not provided, and there are no missing parts of the first control electrode E1 and the second control electrode E2. Therefore, in the effective areas A11 and A12, an ineffective area that does not contribute to the formation of the liquid crystal lens can be reduced.

In addition, each of the first control electrode E1 and the second control electrode E2 is structured with a plurality of linearly extended segments, and the polarization component can be modulated in a direction approximately orthogonal to the direction of extension of each segment. This allows the desired liquid crystal lens to be formed. In one example, if each of the first control electrode E1 and the second control electrode E2 have N segments intersecting at N types of angles, the angle of each segment with respect to the first direction X is preferably set to a pitch of (180°/N). This allows uniform light distribution in multiple directions.

Furthermore, since the total length of each segment is almost equal, the degree of modulation of polarization components by each segment group can be controlled equally.

Figure 7:
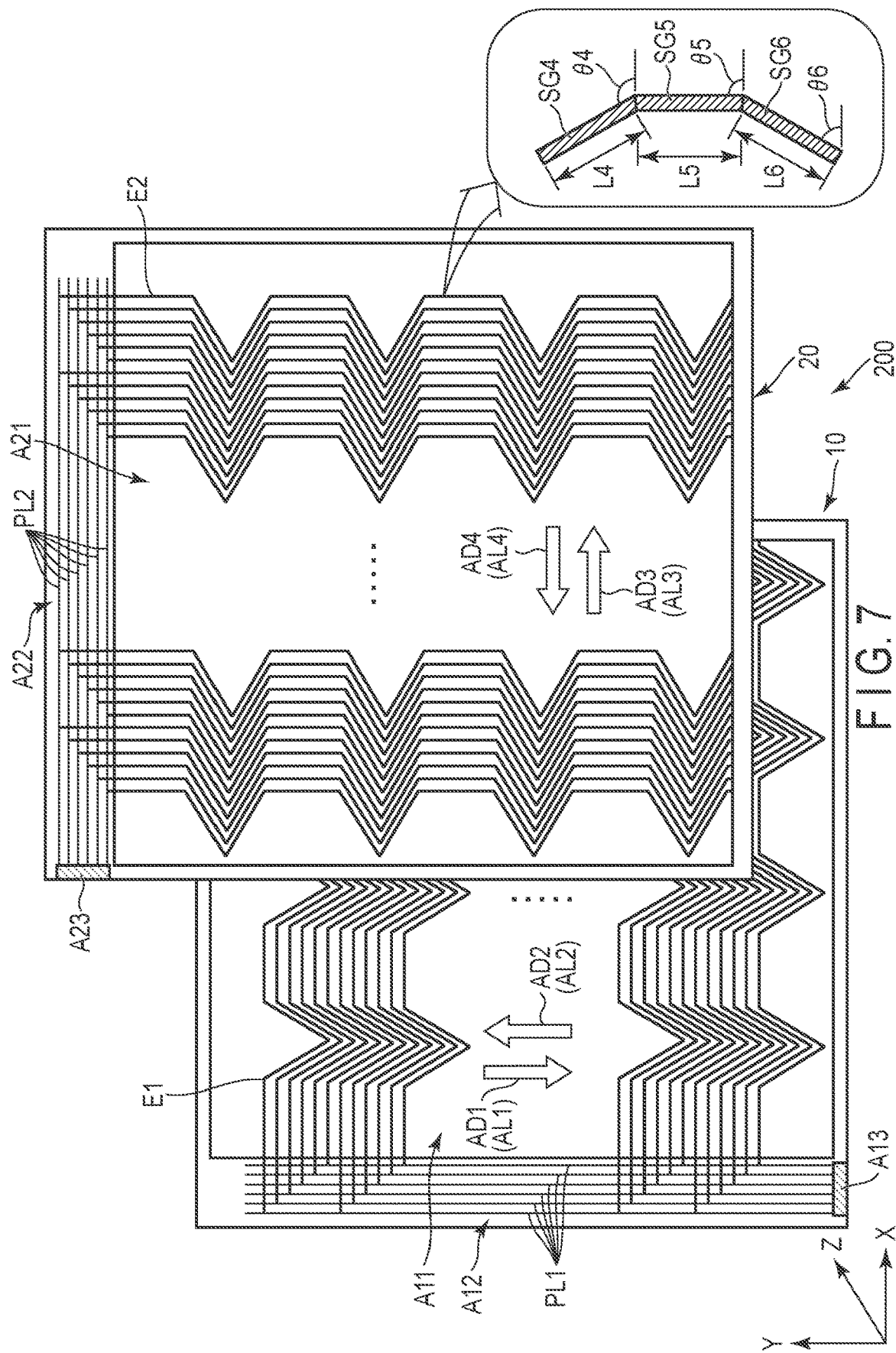
FIG. 7 is a diagram illustrating another structural example of the light control device 200.

FIG. 7 illustrates another structural example of the light control device 200. The structural example of FIG. 7 differs from the structural example of FIG. 6 in that the second control electrode E2 is arranged to intersect the first control electrode E1.

The feed lines PL2 are aligned in the second direction Y in peripheral area A22. The second control electrodes E2 have substantially the same shape, and are aligned in the first direction X in the effective area A21. Each of the second control electrodes E2 extends to the peripheral area A22 and is electrically connected to any of the feed lines PL2.

The shape of the second control electrode E2 will be described below. The second control electrode E2 has a plurality of segments that intersect at different angles to the first direction X. In the example of FIG. 7 shown in an enlarged manner, the second control electrode E2 includes a plurality of fourth segments SG4, a plurality of fifth segments SG5, and a plurality of sixth segments SG6 in the effective area A21. Each of the fourth segments SG4 extends in the direction intersecting the first direction X at a fourth angle θ4. Each of the fifth segments SG5 extends in the direction intersecting the first direction X at a fifth angle θ5. Each of the sixth segments SG6 extends in the direction intersecting the first direction X at a sixth angle θ6. The fourth angle θ4, fifth angle θ5, and sixth angle θ6 are different angles from each other. In addition, the first angle θ1, second angle θ2, and third angle θ3 of the first control electrode E1 described in FIG. 4 are different from the fourth angle θ4, fifth angle θ5, and sixth angle θ6.

In one example, the fourth angle θ4 is 120°, the fifth angle θ5 is 90°, and the sixth angle θ6 is 60°.

Furthermore, focusing on a relationship between the first control electrode E1 and the second control electrode E2, a difference between the first angle θ1 and the fourth angle θ4, a difference between the second angle θ2 and the fifth angle θ5, and a difference between the third angle θ3 and the sixth angle θ6 are almost the same. For example, the difference between the first angle θ1 (30°) and the fourth angle θ4 (120°), the difference between the second angle θ2 (0°) and the fifth angle θ5 (90°), and the difference between the 3rd angle θ3 (150°) and the 6th angle θ6 (60°) are all 90°. In the case of the above angle combinations, the first liquid crystal cell 10 and the second liquid crystal cell 20 can be configured with substantially the same specifications, and the light control device 200 can be provided by overlapping one cell with a 90° rotation relative to the other cell.

Such an example corresponds to a case where the first control electrode E1 and the second control electrode E2 together have six segments intersecting at six different angles, wherein the angle of each segment with respect to the first direction X is set at a pitch of (180°/6=30°).

The fourth angle θ4, fifth angle θ5, and sixth angle θ6 include at least one acute angle and at least one obtuse angle. In the above example, the sixth angle θ6 is an acute angle, and the fourth angle θ4 is an obtuse angle.

The obtuse angle is an integer multiple of the acute angle. In the example above, the fourth angle θ4 (120°) is twice the sixth angle θ6 (60°).

In the effective area A21, the sum of the lengths L4 of the fourth segments SG4, the sum of the lengths L5 of the fifth segments SG5, and the sum of the lengths L6 of the sixth segments SG6 should be approximately equal. For example, if the lengths L4 to L6 are equal, the number of the fourth segments SG4, the number of the fifth segments SG5, and the number of the sixth segments SG6 are equal.

The alignment processing direction AD1 of the alignment film AL1 and the alignment processing direction AD2 of the alignment film AL2 in the first liquid crystal cell 10 are substantially orthogonal to the alignment processing direction AD3 of the alignment film AL3 and the alignment processing direction AD4 of the alignment film AL4 in the second liquid crystal cell 20.

The above structural example can achieve the same advantages achieved by the aforementioned structural example.

Figure 8:
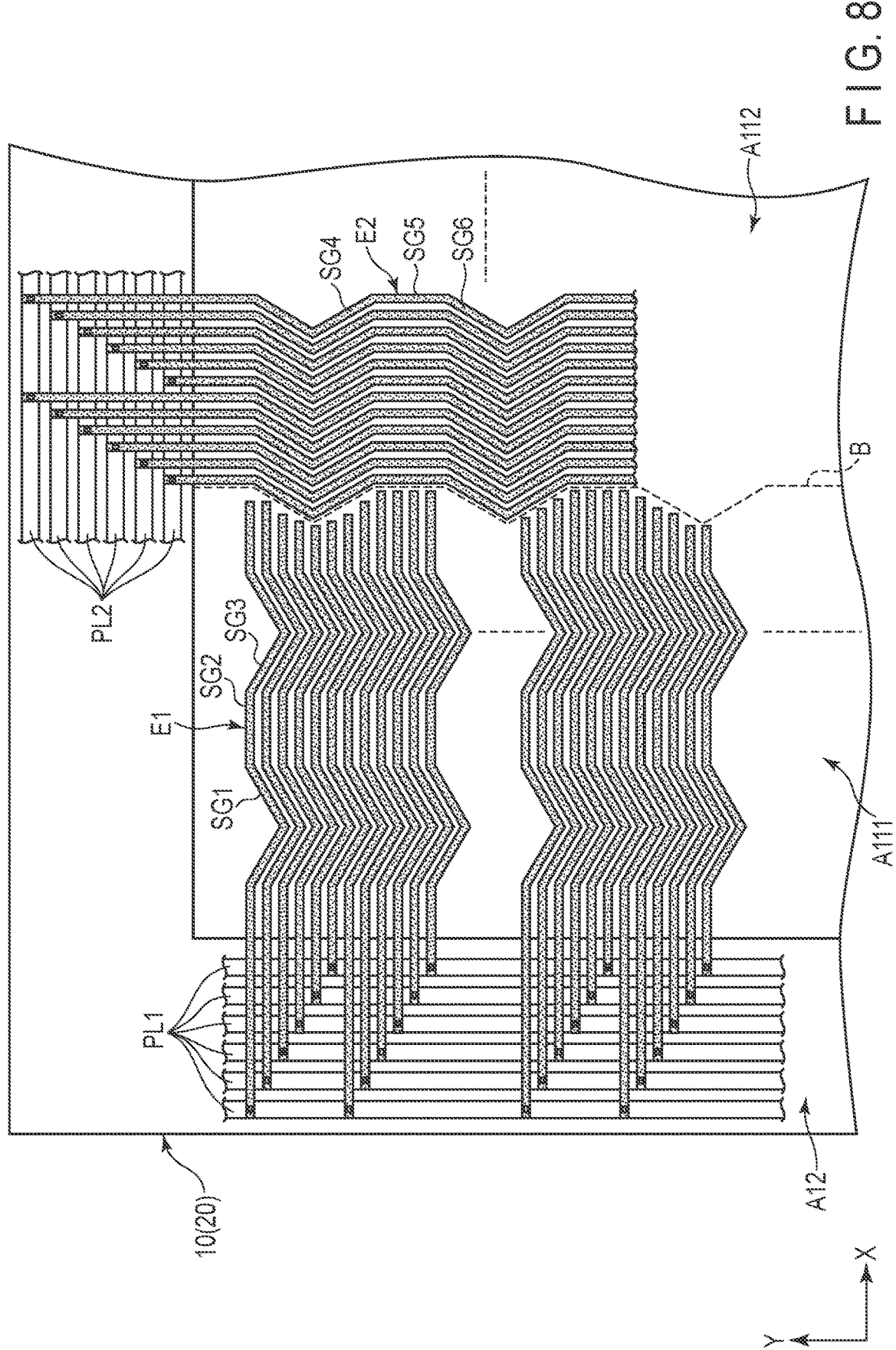
FIG. 8 is a diagram illustrating another structural example of the light control device 200.

FIG. 8 illustrates another structural example of the light control device 200.

In this example, the first liquid crystal cell 10 of the light control device 200 will be described. Note that the second liquid crystal cell 20 is structured with the same specifications as the first liquid crystal cell 10 shown in the figure. However, the alignment processing directions AD1 and AD2 in the first liquid crystal cell 10 are different from the alignment processing directions AD3 and AD4 in the second liquid crystal cell 20, as in the structural example above.

The first liquid crystal cell 10 includes a first effective area A111 and a second effective area A112. The first effective area A111 and the second effective area A112 are adjacent to each other in the first direction X, for example. A plurality of first control electrodes E1 are disposed in the first effective area A111 and are aligned in the second direction Y. A plurality of second control electrodes E2 are disposed in the second effective area A112 and are aligned in the first direction X. Each of the first control electrodes E1 is apart from the second control electrode E2. In the example of FIG. 8, the boundary line B between the first effective area A111 and the second effective area A112 is non-linear along the second control electrode E2, as shown by the dotted line.

The first control electrode E1 includes, as with the structural example described with reference to FIG. 4, first segments SG1, second segments SG2, and third segments SG3. The second control electrode E2 includes, as with the structural example described with reference to FIG. 7, fourth segments SG4, fifth segments SG5, and fifth segments SG6. Each of the segments SG1 through SG6 extends in a different direction from each other.

A plurality of first feed lines PL1 are aligned in the first direction X in a peripheral area A12. Each of the first control electrodes E1 extends into the peripheral area A12 and is electrically connected to any of the first feed lines PL1. A plurality of second feed lines PL2 are aligned in the peripheral area A12 in the second direction Y. Each of the second control electrodes E2 extends into the peripheral area A12 and is electrically connected to any of the second feed lines PL2.

As above, the first liquid crystal cell 10 includes the first control electrode E1 with three segments SG1 to SG3, and the second control electrode E2 with three segments SG4 to SG6. Therefore, the polarization components passing through the first and second liquid crystal cells 10 and 20 diverge in 12 directions in the X-Y plane. Thus, uniform light distribution in more directions can be achieved.

Figure 9:
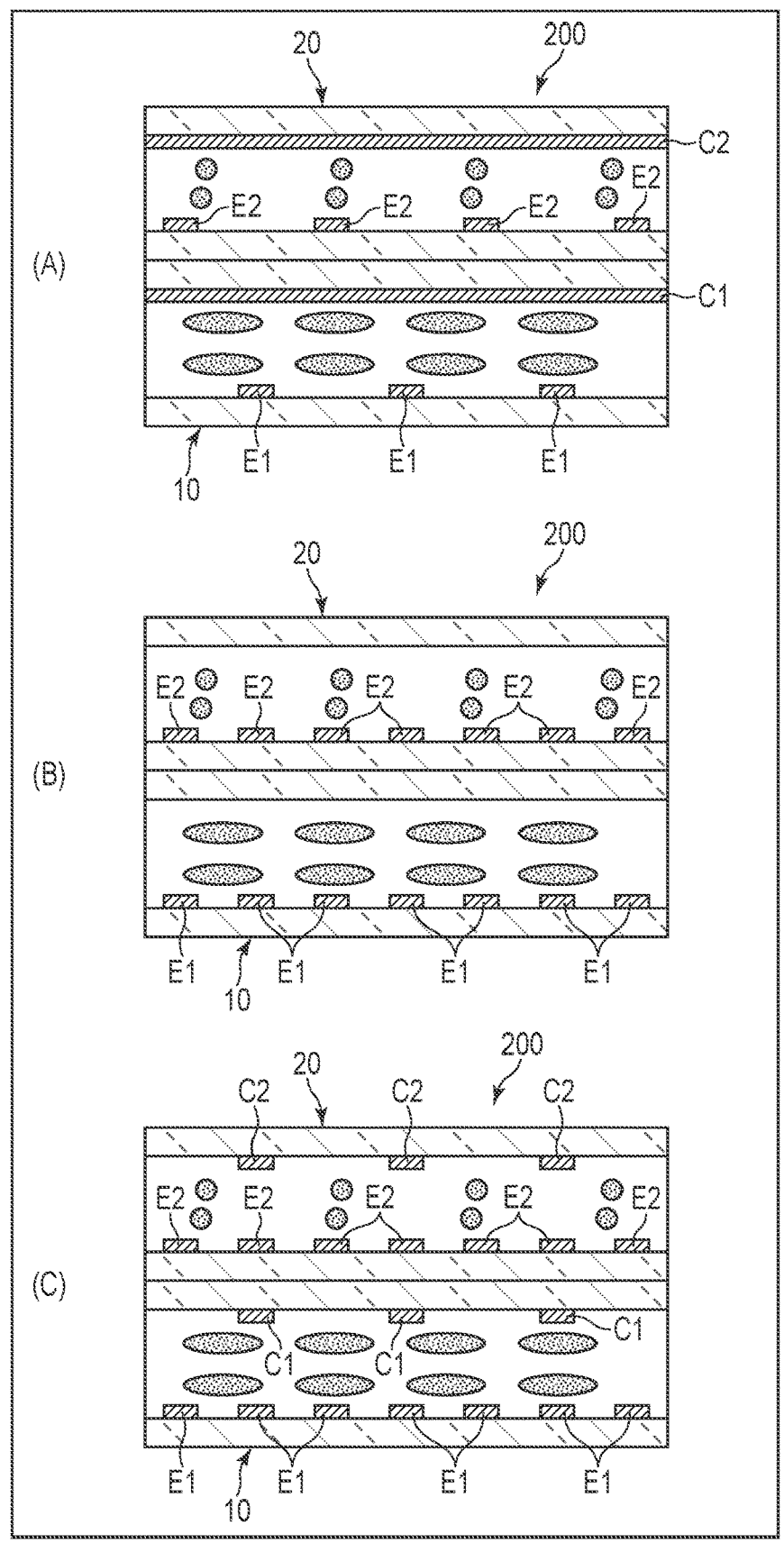
FIG. 9 is a cross-sectional view of another structural example of first and second liquid crystal cells 10 and 20 of the light control device 200.

FIG. 9 is a cross-sectional view illustrating another structural example of the first liquid crystal cell 10 and the second liquid crystal cell 20 of the light control device 200.

In the structural example in (A) of FIG. 9, the first liquid crystal cell 10 and the second liquid crystal cell 20 are configured with the same specifications, while the second control electrode E2 overlaps the first control electrode E1 in a displaced manner.

In the structural example shown in (B) of FIG. 9, the first common electrode C1 of the first liquid crystal cell 10 is omitted, and the second common electrode C2 of the second liquid crystal cell 20 is omitted. In this structural example, the liquid crystal lens is formed in a so-called transverse field type in which an electric field is formed between the adjacent first control electrodes E1 in the first liquid crystal cell 10, and in the same manner, the liquid crystal lens is formed by the electric field between the adjacent second control electrodes E2 in the second liquid crystal cell 20.

In the structural example shown in (C) of FIG. 9, the first common electrode C1 of the first liquid crystal cell 10 is patterned to have the same shape as the first control electrode E1, and the second common electrode C2 of the second liquid crystal cell 20 is patterned to have the same shape as the second control electrode E2.

The above structural example can achieve the same advantages achieved by the aforementioned structural example.

FIG. 10 is a plan view of another structural example of the second control electrode E2. In the structural example of FIG. 7, the fourth segment SG4, fifth segment SG5, and sixth segment SG6 are arranged in this order, forming a repeating unit of the second control electrode E2, however, the shape of the second control electrode E2 is not limited thereto.

In the structural example in (A) of FIG. 10, the fifth segment SG5, fifth segment SG5, fourth segment SG4, sixth segment SG6, fourth segment SG4, and sixth segment SG6 are arranged in this order, forming a repeating unit of the second control electrode E2.

In the structural example in (B) of FIG. 10, the fifth segment SG5, fourth segment SG4, sixth segment SG6, fifth segment SG5, sixth segment SG6, and fourth segment SG4 are arranged in this order, forming a repeating unit of the second control electrode E2.

In the structural example in (C) of FIG. 10, the sixth segment SG6, fourth segment SG4, fifth segment SG5, fifth segment SG5, fourth segment SG4, and sixth segment SG6 are arranged in this order, forming a repeating unit of the second control electrode E2.

In the structural example in (D) of FIG. 10, the fourth segment SG4, fifth segment SG5, and sixth segment SG6 are arranged in this order, forming a repeating unit of the second control electrode E2. However, the fourth segment SG4 extends in a direction intersecting the first direction X at a fourth angle ($\theta 4 \pm \Delta\theta$). The fifth segment SG5 extends in a direction intersecting the first direction X at a fifth angle ($\theta 5 \pm \Delta\theta$). The sixth segment SG6 extends in a direction intersecting the first direction X at a sixth angle ($\theta 6 \pm \Delta\theta$). In one example, $\Delta\theta$ is given by (90°/N) when the first and second control electrodes E1 and E2 have N segments intersecting at N types angles.

For example, in a first repetition unit, $\Delta\theta$ is set to 5°, in a second repetition unit, $\Delta\theta$ is set to 10°, and in a third repetition unit, $\Delta\theta$ is set to 15°, so as to achieve uniform light distribution in more directions in the X-Y plane.

In every structural example, the repeating units are formed such that the sum of the lengths of each segment becomes equal each other. The second control electrode E2 may be composed of a combination of the above structural examples. The structural example of the second control electrode E2 described here is also applicable to the first control electrode E1.

Figure 11:
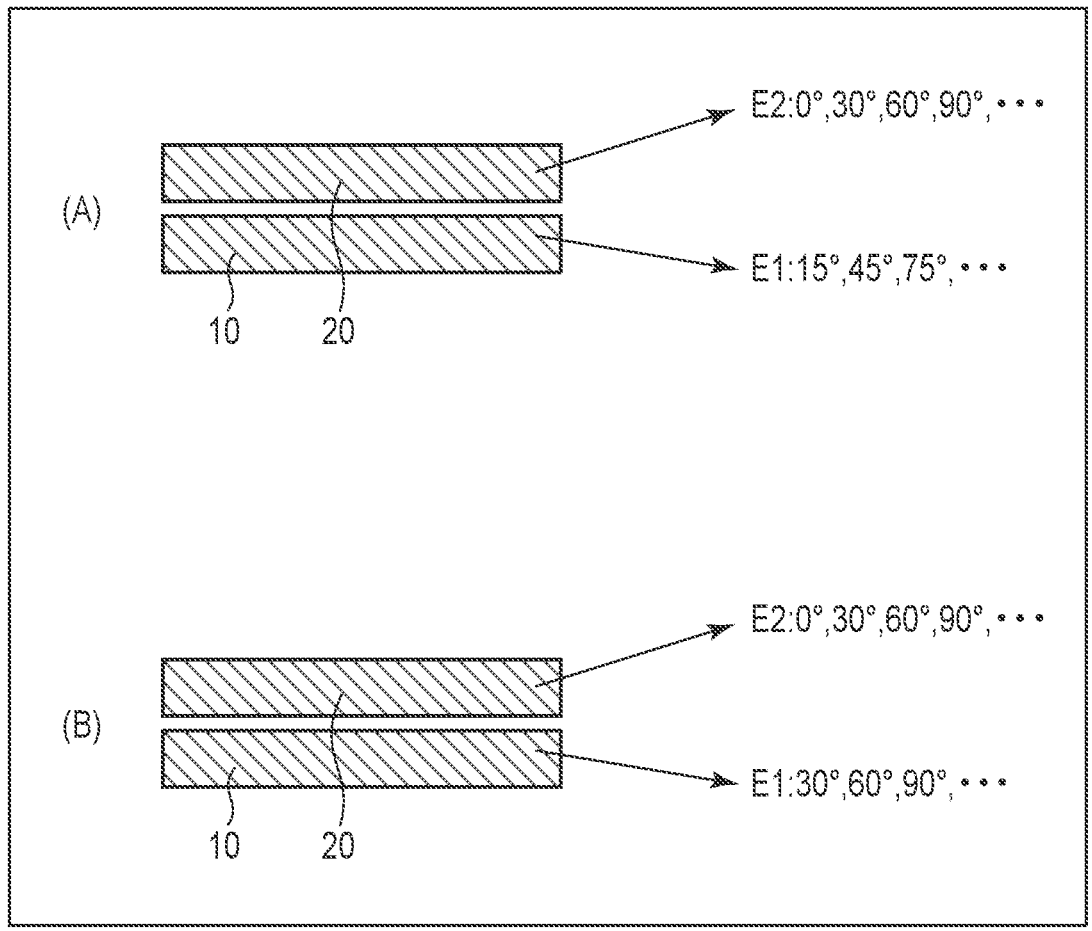
FIG. 11 is a diagram illustrating another structural example of the light control device 200.

FIG. 11 illustrates another structural example of the light control device 200. (A) and (B) of FIG. 11 show a combination of a plurality of segments of the first control electrode E1 in the first liquid crystal cell 10 and a plurality of segments of the second control electrode E2 in the second liquid crystal cell 20. The angle in FIG. 11 shows the angle of intersection with respect to the first direction X.

In the structural example in (A) of FIG. 11, the first control electrode E1 includes a segment extending at a direction of 15°, segment extending at a direction of 45°, and segment extending at a direction of 75°. The pitch of the direction of each segment in the first control electrode E1 is 30°. The second control electrode E2 includes a segment extending at a direction of 0°, segment extending at a direction of 30°, segment extending at a direction of 60°, and segment extending at a direction of 90°. The pitch of the direction of each segment in the second control electrode E2 is also 30°.

In the structural example in (B) of FIG. 11, the first control electrode E1 includes a segment extending at a direction of 30°, segment extending at a direction of 60°, and segment extending at a direction of 90°. The second control electrode E2 includes a segment extending at a direction of 0°, segment extending at a direction of 30°, segment extending at a direction of 60°, and segment extending at a direction of 90°.

The above structural example can achieve the same advantages achieved by the aforementioned structural example.

Figure 12:
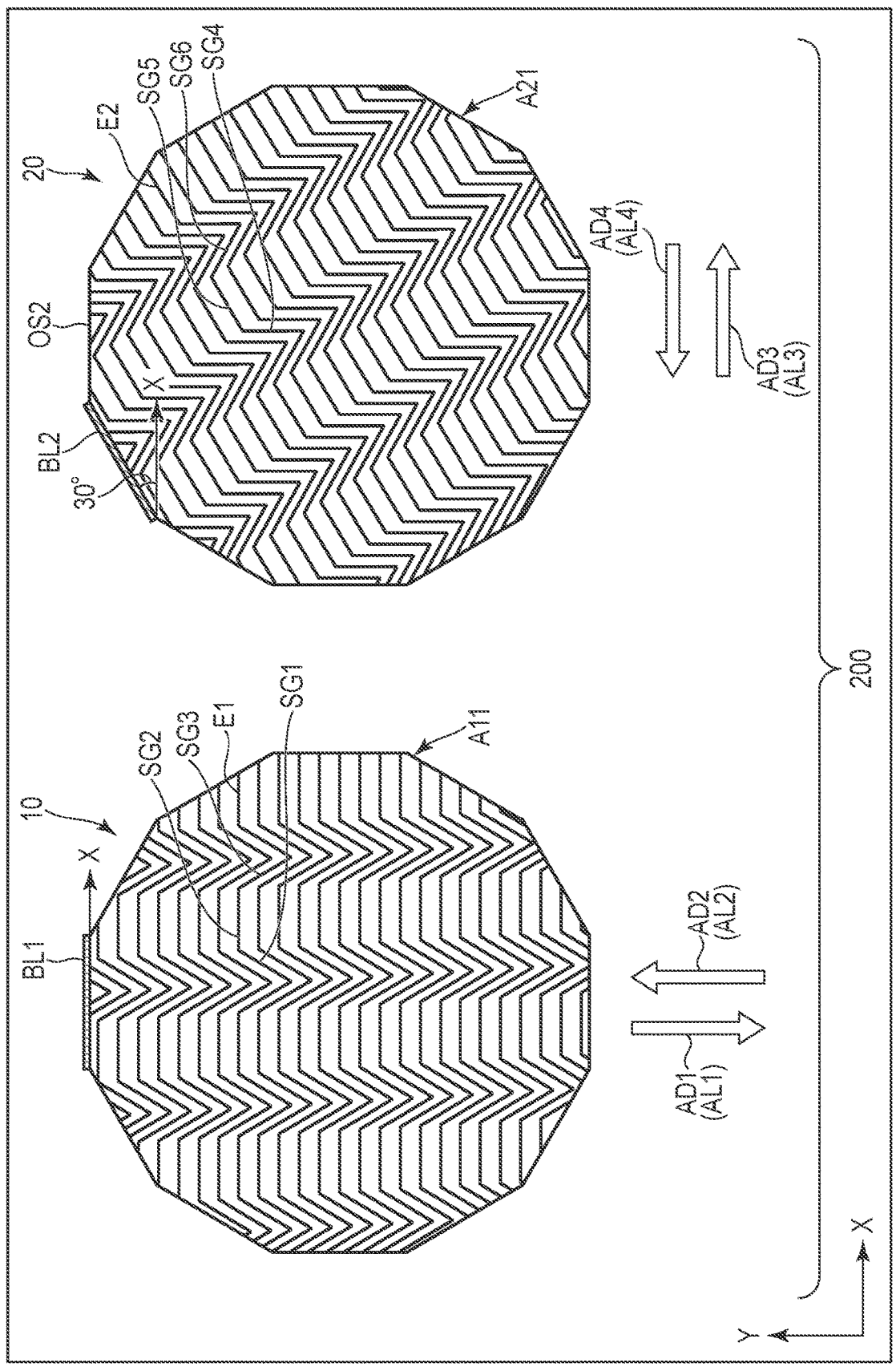
FIG. 12 is a diagram illustrating another structural example of the light control device 200.

FIG. 12 shows another structural example of the light control device 200. In the structural example of FIG. 12, the light control device 200 includes a first liquid crystal cell 10 and a second liquid crystal cell 20. In this example, the effective area A11 and the first control electrode E1 of the first liquid crystal cell 10, and the effective area A21 and the second control electrode E2 of the second liquid crystal cell 20 are shown.

The effective area A11 is substantially the same as the effective area A21. That is, effective areas A11 and A21 have the same outline, and the shape of the first control electrode E1 matches that of the second control electrode E2. For example, effective areas A11 and A21 have the outline of a regular dodecagon. The first control electrode E1 includes first segments SG1, second segments SG2, and third segments SG3. The second control electrode E2 includes fourth segments SG4 that matches the first segments SG1, fifth segments SG5 that matches the second segments SG2, and sixth segments SG6 that matches the third segments SG3.

One side of the outline of the effective area A11 that is parallel to the second segment SG2 is denoted as reference line BL1. The reference line BL1 is parallel to the first direction X. One side of the outline of the effective area A21 that is parallel to the fifth segment SG5 is denoted as reference line BL2. The reference line BL2 intersects the first direction X at an angle of 30°. That is, the effective area A21 corresponds to an effective area A11 rotated by 30° in the X-Y plane. The outline of the effective area A21 includes a side OS2 parallel to the first direction X. The side OS2 is adjacent to the reference line BL2.

The first liquid crystal cell 10 and the second liquid crystal cell 20 are arranged such that one side OS2 of the effective area A21 overlaps the reference line BL1 of the effective area A11. Note that the alignment processing directions AD1 and AD2 in the effective area A11 are orthogonal to the first direction X, and the alignment processing directions AD3 and AD4 in the effective area A21 are parallel to the first direction X.

The above structural example can achieve the same advantages achieved by the aforementioned structural example. In addition, effective areas A11 and A21 can be formed by patterning using the same photomask. Therefore, the manufacturing cost can be reduced compared to the case where separate photomasks are prepared for manufacturing the first liquid crystal cell 10 and the second liquid crystal cell 20.

Figure 13:
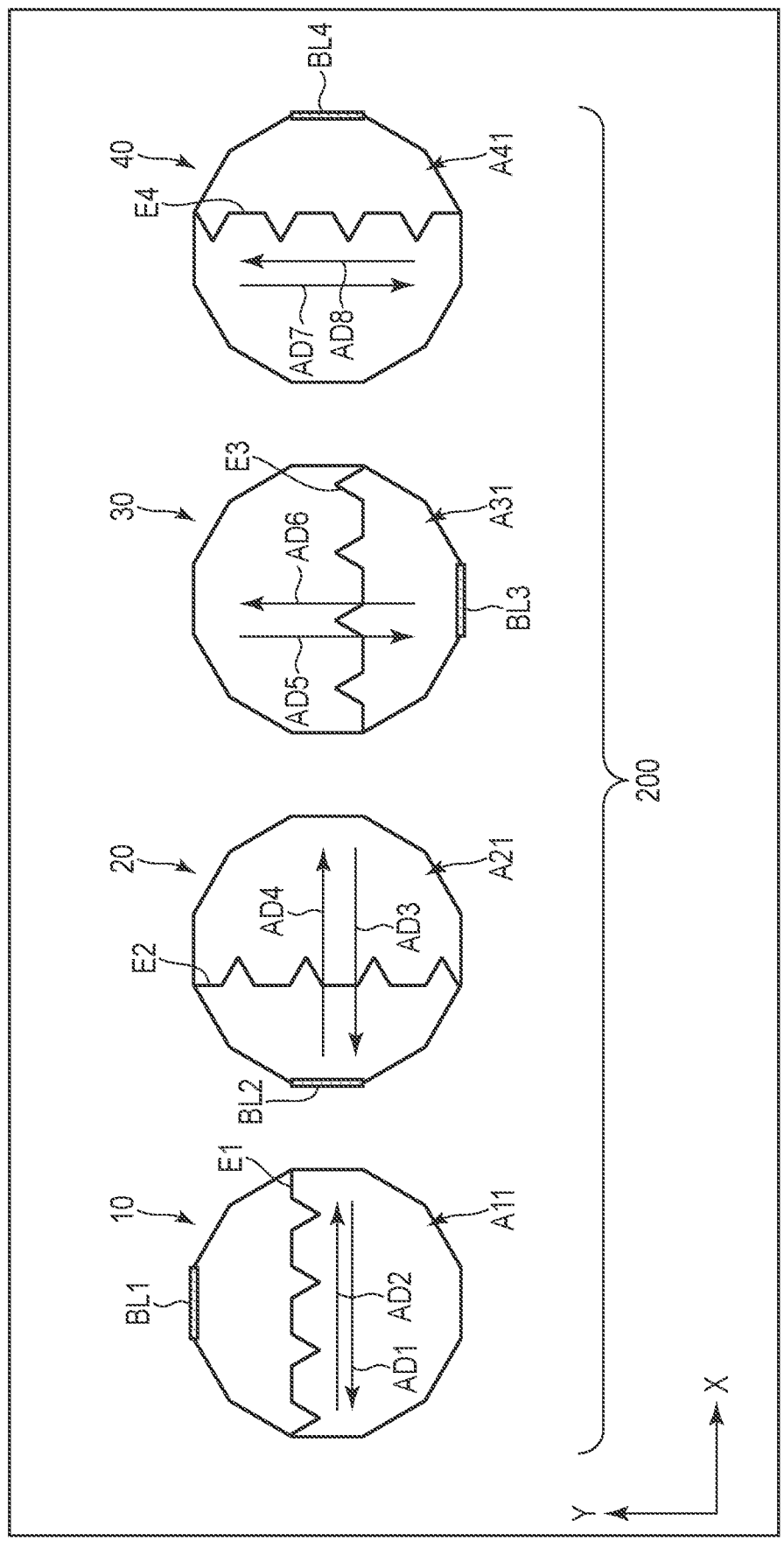
FIG. 13 is a diagram illustrating another structural example of the light control device 200.

FIG. 13 shows another structural example of the light control device 200. In the structural example of FIG. 13, the light control device 200 includes a first liquid crystal cell 10, second liquid crystal cell 20, third liquid crystal cell 30, and fourth liquid crystal cell 40. The third liquid crystal cell 30 and the fourth liquid crystal cell 40 are structured the same as the first liquid crystal cell 10 and the second liquid crystal cell 20 described above. In this example, an effective area A11 of the first liquid crystal cell 10, effective area A21 of the second liquid crystal cell 20, effective area A31 of the third liquid crystal cell 30, and effective area A41 of the fourth liquid crystal cell 40 are shown.

The effective areas A11, A21, A31, and A41 are substantially the same, and have the same outline. Furthermore, the shape of the first control electrode E1 in the effective area A11, shape of the second control electrode E2 in the effective area A21, shape of the third control electrode E3 in effective area A31, and shape of the fourth control electrode E4 in effective area A41 are identical.

Here, a reference line BL1 of the effective area A11, reference line BL2 of the effective area A21, reference line BL3 of the effective area A31, and reference line BL4 of the effective area A41 will be considered. The effective area A21 corresponds to the effective area A11 rotated by 90° in the X-Y plane. The effective area A31 corresponds to the effective area A11 rotated by 180° in the X-Y plane. The effective area A41 corresponds to the effective area A11 rotated by 270° in the X-Y plane.

Alignment processing directions AD1 and AD2 in the effective area A11, and alignment processing directions AD3 and AD4 in the effective area A21 are parallel to the first direction X. Alignment processing directions AD5 and AD6 in the effective area A31 and alignment direction AD7 and AD8 in the effective area A41 are orthogonal to the first direction X.

In such a light control device 200, one polarization component of first polarization component POL1 and second polarization component POL2 is mainly modulated by the first liquid crystal cell 10 and the second liquid crystal cell 20, and the other polarization component is mainly modulated by the third liquid crystal cell 30 and the fourth liquid crystal cell 40.

The above structural example can achieve the same advantages achieved by the aforementioned structural example.

Figure 14:
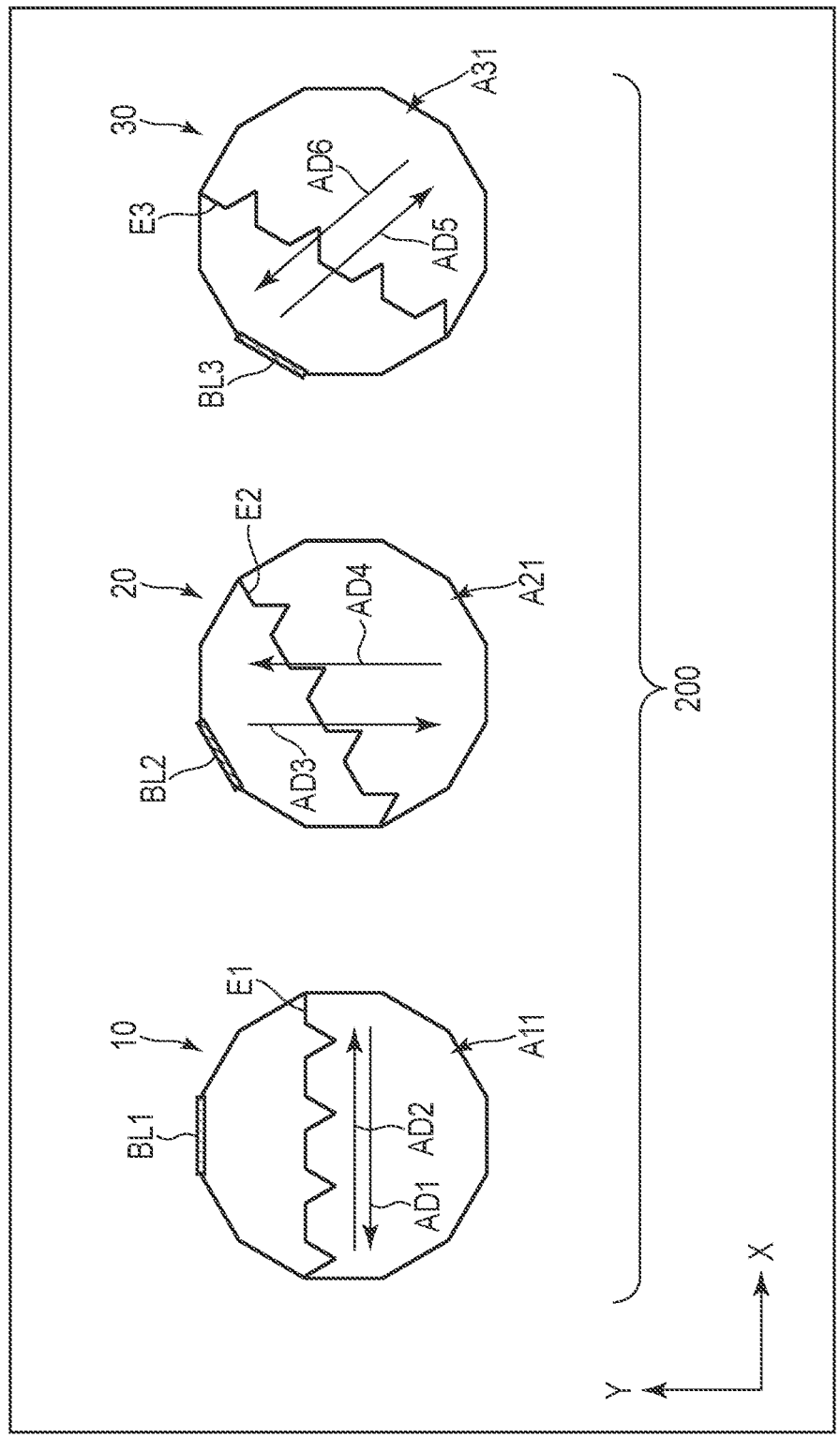
FIG. 14 is a diagram illustrating another structural example of the light control device 200.

FIG. 14 shows another structural example of the light control device 200. In the structural example of FIG. 14, the light control device 200 includes a first liquid crystal cell 10, second liquid crystal cell 20, and third liquid crystal cell 30. Here, the effective area A11 of the first liquid crystal cell 10, effective area A21 of the second liquid crystal cell 20, and effective area A31 of the third liquid crystal cell 30 are shown.

The effective areas A11, A21, and A31 are substantially the same and have the same outline. Furthermore, the shape of the first control electrode E1 in the effective area A11, the shape of the second control electrode E2 in the effective area A21, and the shape of the third control electrode in the effective area A31 are identical.

Here, a reference line BL1 of the effective area A11, reference line BL2 of the effective area A21, and reference line BL3 of the effective area A31 will be considered. The effective area A21 corresponds to the effective area A11 rotated by 30° in the X-Y plane. The effective area A31 corresponds to the effective area A11 rotated by 60° in the X-Y plane.

Alignment processing directions AD1 and AD2 in the effective area A11 are parallel to the first direction X. Alignment processing directions AD3 and AD4 in the effective area A21 are orthogonal to the first direction X. Alignment processing directions AD5 and AD6 in the effective area A31 intersect the first direction at 135°.

In such a light control device 200, one polarization component of the first polarization component POL1 and the second polarization component POL2 is mainly modulated by the first liquid crystal cell 10, the other polarization component is mainly modulated by the second liquid crystal cell 20, and both polarization components are modulated by the third liquid crystal cell 30.

The above structural example can achieve the same advantages achieved by the aforementioned structural example.

In the above structural examples, the effective area is described as a polygon, but it may be a circle. When multiple liquid crystal cells are stacked and aligned, the effective area can be polygonal or circular to facilitate alignment.

Furthermore, in each liquid crystal cell, a pair of alignment films sandwiching the liquid crystal layer are aligned in the same direction and in opposite directions, but they may be aligned so that they cross each other. The liquid crystal mode can be horizontal alignment mode, vertical alignment mode, twist alignment mode, or any other mode.

As explained above, the present embodiment can provide a light control device and an illumination device that can reduce the ineffective area.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A light control device comprising:
   a first liquid crystal cell including a first control electrode; and
   a second liquid crystal cell including a second control electrode, wherein
   the second liquid crystal cell overlaps the first liquid crystal cell,
   the first control electrode and the second control electrode are transparent electrodes,
   the first control electrode includes first segments crossing a first direction at a first angle, second segments crossing the first direction at a second angle, and third segments crossing the first direction at a third angle,
   the second control electrode includes fourth segments crossing the first direction at a fourth angle, fifth segments crossing the first direction at a fifth angle, and sixth segments crossing the first direction at a sixth angle, and
   the first to sixth angles are different from each other.

2. The light control device of claim 1, wherein a difference between the first angle and the fourth angle, a difference between the second angle and the fifth angle, and a difference between the third angle and the sixth angle are substantially equal.

3. The light control device of claim 2, wherein
   the first to third angles include at least one first acute angle and at least one first obtuse angle, and
   the fourth to sixth angles include at least one second acute angle and at least one second obtuse angle.

4. The light control device of claim 3, wherein
   the first obtuse angle is an integral multiple of the first acute angle, and
   the second obtuse angle is an integral multiple of the second acute angle.

5. The light control device of claim 1, wherein
   a sum of lengths of the first segments, a sum of lengths of the second segments, and a sum of lengths of the third segments are substantially equal, in the first liquid crystal cell, and
   a sum of lengths of the fourth segments, a sum of lengths of the fifth segments, and a sum of lengths of the sixth segments are substantially equal, in the second liquid crystal cell.

6. The light control device of claim 1, further comprising a transparent adhesive layer which adheres the first liquid crystal cell and the second liquid crystal cell.

7. The light control device of claim 1, wherein
   the first liquid crystal cell includes a first liquid crystal layer,
   the second liquid crystal cell includes a second liquid crystal layer, and
   an initial alignment direction of the first liquid crystal layer crosses an initial alignment direction of the second liquid crystal layer.

8. A light control device comprising:
   a first substrate including a plurality of first control electrodes disposed in a first effective area, and a plurality of second control electrodes disposed in a second effective area which is adjacent to the first effective area;
   a second substrate; and
   a first liquid crystal layer held between the first substrate and the second substrate, wherein
   the first control electrodes and the second control electrodes are transparent electrodes,
   the first control electrodes are apart from the second control electrodes,
   each of the first control electrodes includes first segments crossing a first direction at a first angle, second segments crossing the first direction at a second angle, and third segments crossing the first direction at a third angle,
   each of the second control electrodes includes fourth segments crossing the first direction at a fourth angle, fifth segments crossing the first direction at a fifth angle, and sixth segment crossing the first direction at a sixth angle, and
   the first to sixth angles are different from each other.

9. The light control device of claim 8, wherein
   the first substrate further includes a plurality of first feed lines aligned in the first direction in a peripheral area, and a plurality of second feed lines aligned in a second direction in the peripheral area,
   each of the first control electrodes extends in the peripheral area and is electrically connected to one of the first feed lines, and each of the second control electrodes extends in the peripheral area and is electrically connected to one of the second feed lines.

10. An illumination device comprising:

a light source; and a light control device configured to control light emitted from the light source, wherein the light control device includes a first liquid crystal cell including a first control electrode and a second liquid crystal cell including a second control electrode, wherein the second liquid crystal cell overlaps the first liquid crystal cell, the first control electrode and the second control electrode are transparent electrodes, the first control electrode includes first segments crossing a first direction at a first angle, second segments crossing the first direction at a second angle, and third segments crossing the first direction at a third angle, the second control electrode includes fourth segments crossing the first direction at a fourth angle, fifth segments crossing the first direction at a fifth angle, and sixth segments crossing the first direction at a sixth angle, and the first to sixth angles are different from each other.

11. An illumination device comprising:

a light source; and a light control device configured to control light emitted from the light source, wherein the light control device includes a first substrate including a plurality of first control electrodes disposed in a first effective area and a plurality of second control electrodes disposed in a second effective area which is adjacent to the first effective area, a second substrate, and a first liquid crystal layer held between the first substrate and the second substrate, wherein the first control electrodes and the second control electrodes are transparent electrodes, the first control electrodes are apart from the second control electrodes, each of the first control electrodes includes first segments crossing a first direction at a first angle, second segments crossing the first direction at a second angle, and third segments crossing the first direction at a third angle, each of the second control electrodes includes fourth segments crossing the first direction at a fourth angle, fifth segments crossing the first direction at a fifth angle, and sixth segments crossing the first direction at a sixth angle, and the first to sixth angles are different from each other.

* * * * *